United States Patent [19]

Bell et al.

[11] Patent Number: 4,669,003
[45] Date of Patent: May 26, 1987

[54] METHOD AND APPARATUS FOR ELIMINATING APPARENT OFFSET IN THE SERVO CODE IN A MAGNETIC DISC DRIVE

[75] Inventors: R. Frank Bell, Meridian; Roger V. Wilcox, Boise, both of Id.

[73] Assignee: Hewlett-Packard Company, Palo Alto, Calif.

[21] Appl. No.: 858,996

[22] Filed: May 2, 1986

[51] Int. Cl.$^4$ .......................... G11B 5/55; G11B 5/56
[52] U.S. Cl. .................................. 360/77; 360/78
[58] Field of Search .................................. 360/77, 78

[56] References Cited

U.S. PATENT DOCUMENTS 4,539,607 9/1985 Fujiki .................................. 360/77
4,602,304 7/1986 Fultz .................................. 360/77

Primary Examiner—George G. Stellar
Attorney, Agent, or Firm—William J. Bethurum

[57] ABSTRACT

This method and apparatus for eliminating apparent offset in the servo code adjacent to a guard band on a magnetic memory disc utilizes at least two phases of servo code per magnetic cell for seeking and track centering, or track following, operations and two phases or guard band code per magnetic cell. The two phases or guard band code are each either in phase or similarly out of phase with the respective phases of the servo code in individual magnetic cells.

Phase locking on a selected phase of guard band code is achieved by providing a synchronizing code in the guard band using an irregular pattern of guard band code, providing a timing signal count representing a cell count, for example, decoding the synchronizing code to provide an end of code signal and utilizing the end of code signal and a predetermined cell count signal to achieve phase locking on the correct phase of the guard band code.

17 Claims, 9 Drawing Figures

METHOD AND APPARATUS FOR ELIMINATING APPARENT OFFSET IN THE SERVO CODE IN A MAGNETIC DISC DRIVE

TECHNICAL FIELD

This invention relates generally to magnetic disc memory drives employing a dedicated servo disc used in track seeking and track centering operations. This type of apparatus is disclosed and claimed in a related copending application Ser. No. 829,689 of Donald J. Fasen and Roger V. Wilcox, entitled "Process and System for Compensating for Information Shifts on Disc Storage Media" Feb. 14, 1986 and assigned to the assignee of this invention.

More particularly this invention is directed to a method and apparatus for eliminating the apparent offset in the position of a monolithic magnetic head in relation to a track centered position in those radial positions where the body or slider of the monolithic magnetic head straddles the guard band and the servo code tracks on the dedicated servo disc.

BACKGROUND ART

All high performance data storage devices utilizing magnetic disc technology require some type of servo mechanism to accurately and repeatedly position the write/read heads at the locations where data is to stored or retrieved. Timing information giving the head position relative to the disc rotation is also required. One method of implementing the servomechanism and generating the required timing involves permanently recording on one surface of one disc in the disc drive, a pattern of magnetic transitions or magnetic zones commonly called dedicated servo code. No data is ever recorded on this surface and the surface is "dedicated" servo and timing functions.

The pattern of magnetic transitions or magnetic zones, utilized for the servo code conventionally comprises a two-phase code. Two recording signals are used. These consist of pulses at the same repetition rate (frequency) but displaced in time relative to each other by one half of the period (180 degrees in phase), producing a discrete magnetic zone in each of two adjacent tracks in circumferentially spaced positions.

Position servoing is achieved by traversing recorded magnetic zones and reading the amplitude of generated pulses separated by 180 electrical degrees and using this information to control the radial position of the magnetic head so that the amplitudes are equal. The center of the magnetic head will then be half way between the locations where the two tracks of magnetic servo code were written.

Decoding the servo code to generate a position error signal requires knowledge of the timing relationship between the phases of the servo code. The position signal is basically the difference in amplitude between the two generated pulses with are 180 degrees apart. The timing is usually obtained from a phase locked loop which is locked to a specific phase of the servo code. Since the servo code produces more than one phase of generated signals the phase locked loop is not guaranteed to lock to the correct phase. Once locked, however, a properly designed phase locked loop will remain locked to whichever phase it has acquired.

A technique commonly used to force the phase locked loop to lock to the proper phase, employs an area of single phase code adjacent to the normal servo code. This area of single phase code is called a guard band and may be at either the inside diameter or the outside diameter, or both, of the servo code on the dedicated servo disc. The magnetic servo head can then be positioned over the single phase guard band and the phase locked loop forced to lock to the proper phase. The phase lock will be maintained when the head is positioned over the servo code and the position error signal can be properly decoded.

A magnetic servo head flying very close to the surface of a magnetic disc is affected by magnetic transitions located some distance on either side of the flux sensing element of the magnetic servo head. The sensitive distance can be as much as one half of the width of the body or slider of the magnetic servo head, which is equivalent to a significant number of tracks in a high density disc drive. When a servo head is positioned near a single phase guard band, with one side of the body or slider in the guard band, the affect of the guard band on the read signal is to slightly add to the servo code pulse which is in phase with the guard band pulse, but there will be no affect on the servo code pulse which is 180 degrees out of phase with the guard band. This introduces an offset or error in the position signal decoded from the servo code near the guard band. The magnitude of the error will depend on the magnetic head design and the proximity of the body or slider of the magnetic head to the guard band. In high performance disc drives, this error is sufficient to require correction. This present difficult servo design problems.

DISCLOSURE OF THE INVENTION

This invention solves the problem of position signal error in the vicinity of the guard band. The solution comprises changing the format of the magnetic transitions or magnetic zones written in the guard band, and, since the new guard band provides multiple phases to the phase locked loop, an arrangement is provided to guarantee that the phase locked loop locks to the proper phase of the guard band signal.

The new guard band format is written with two phases of magnetic zones which are in phase with two phases of servo code. The respective magnetic zones are disposed in adjacent tracks in circumferentially spaced positions and define a period in which pulses read from the magnetic zones are 180 degrees apart. Two such magnetic zone recordings define a magnetic cell on the servo disc. Thus, when the corresponding two phases of servo code are being used to generate a position error signal, the affect of a nearby guard band is the same on both phases of servo code. Since the position error signal is the difference in amplitude between the two phases, the offset due to the proximity of the guard band is balanced between the phases and there is no net effect.

In quadrature code, such as that described in the above referenced copending application, there are four separate recording signals, producing four separate discrete magnetic zones, each one being one track wide but spaced one half of a track apart, in progressively circumferentially spaced positions. These are successively displaced by 90 electrical degrees, that is, one fourth of the period. In this situation, when the position error signal is being generated using the two phases of the four phase servo code which do not correspond to the two phases used in the guard band, there is no contribution to the signal from the servo head due to the proximity of the guard band and no offset is generated.

The problem of assuring that the phase locked loop always locks to the correct phase of the guard band is solved by omitting a few isolated phases of the guard band code in a predetermined pattern, defining a synchronizing code. Stated otherwise, the synchronizing code is defined by a short pattern of single phase magnetic zones or recordings, which are recorded in the guard band. This pattern is designed to be unique and such that it will be decoded at an exactly known time or location relative to the phases (magnetic zones) of the guard band code. When this synchronizing code pattern of magnetic zones is decoded, a pulse is generated which, either alone or together with a predetermined count of a timing counter, indicating a cell count, for example, is used to force the phase locked loop to lock on the correct phase in a predetermined cell of the guard band.

BEST MODE FOR CARRYING OUT THE INVENTION

This invention is employed in a magnetic disc memory drive which typically comprises a plurality of memory discs which are stacked axially on a disc spin axis in a parallel plane array. One surface of one disc, called the dedicated servo surface, is dedicated to servo code. The other surface of the dedicated disc and the two surfaces of the remaining discs are used to record data. The disc surfaces are scanned by individual magnetic heads which are used for writing and reading data in concentric data tracks. These heads are flexibly supported from the end of a movable carriage which moves the heads as a unit radially over the disc surfaces. The flexible mount provides angular freedom of the heads in pitch and roll and spring loaded freedom for movement vertically above the disc surface. In operation, the magnetic heads each literally fly above the adjacent surface of the spinning discs on the thin film of air clinging to the surface of each of the spinning discs. Such an arrangement is known in the art.

Figure 1:
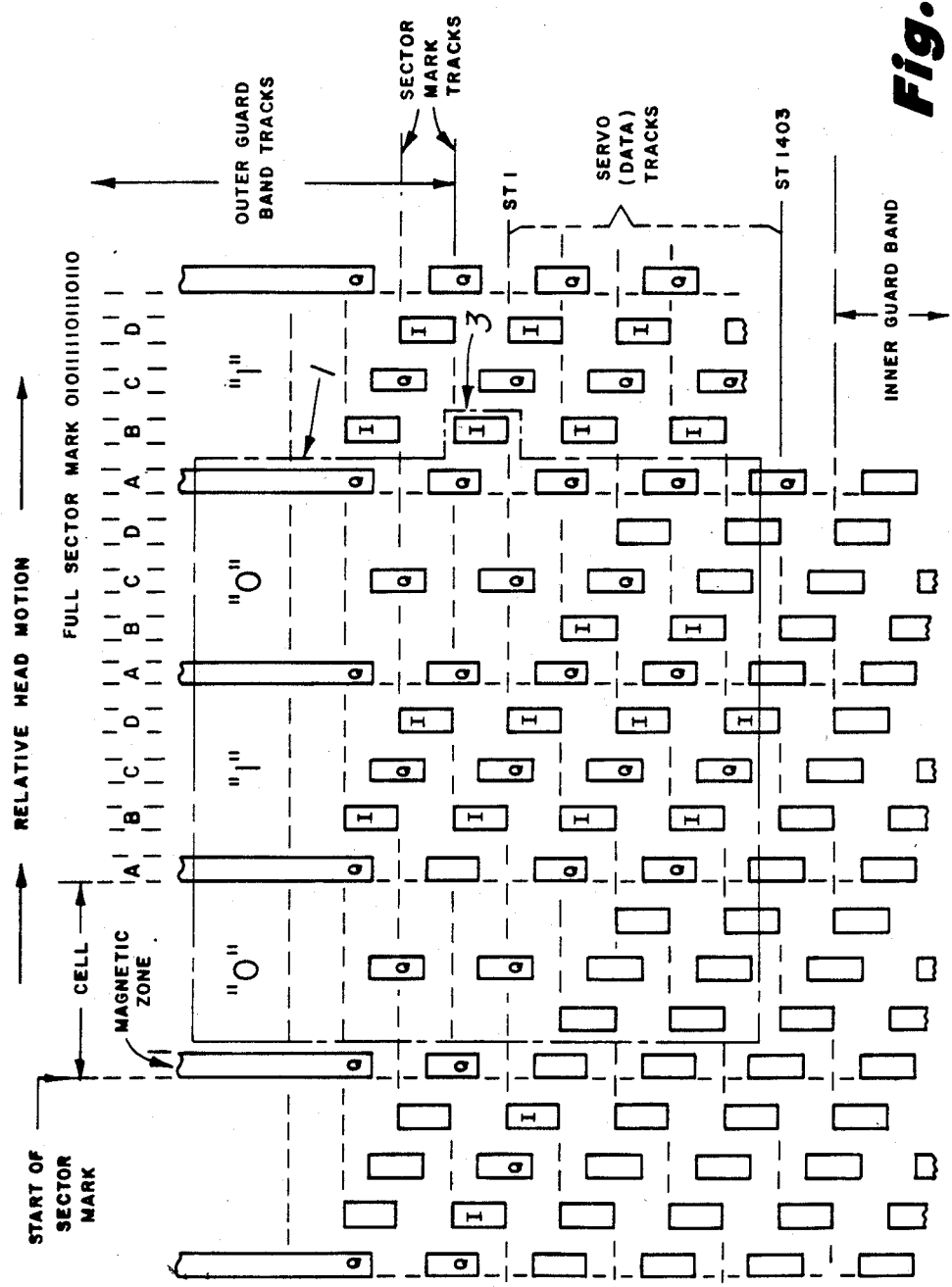
FIG. 1 illustrates a portion of a servo disc for a disc memory having four phases of servo code and a single phase servo guard band. This figure illustrates the undesirable track offset error solved by this invention.
Figure 2:
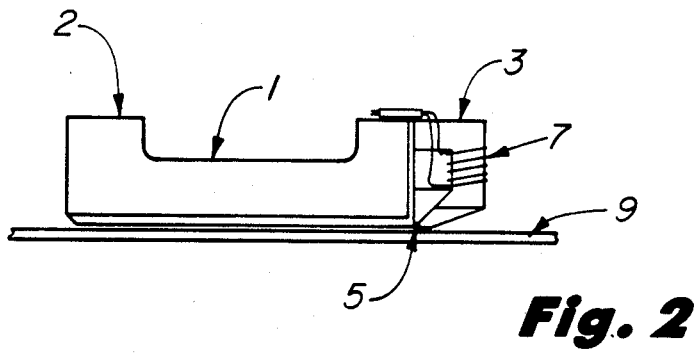
FIGS. 2, 3 and 4 are respectively side, bottom and front views of a typical magnetic head for use in writing and reading on discs of the type of FIG. 1.
Figure 3:
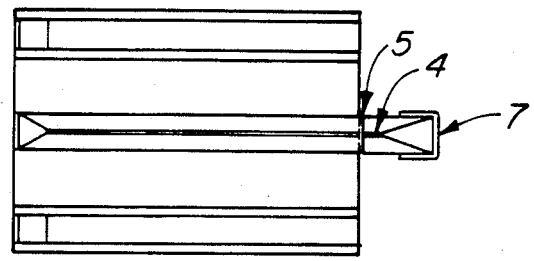
Figure 4:
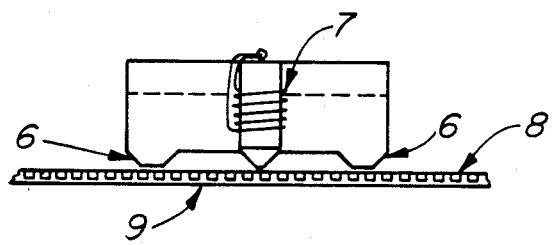

FIG. 1 depicts a portion of the servo code magnetic zone pattern of one type of magnetic disc. And FIGS. 2, 3, and 4 are differing views of a magnetic head used for writing and reading magnetic zones on magnetic disc surfaces, which is usable in reading the servo code on the dedicated servo disc of FIG. 1.

FIG. 1 illustrates the magnetization of the surface of a dedicated servo disc having a single phase guard band and is used to describe the problem solved by this invention. The surface of the disc is represented by the surface of the paper and is of one magnetic polarity. The small rectangles show areas of the opposite polarity. The small rectangles represent magnetic zones. The patterns of these magnetic zones have been drawn so that what is actually a circle on the disc appears as a straight horizontal line on the paper. Radial displacement from the center of the disc occurs on a vertical line with the center at the bottom of the figure. Relative head motion in scanning the surface of the disc in the individual tracks is from left to right, as viewed. The surface of the servo disc is divided into sectors and each sector is divided into magnetic cells. The beginning of each sector is marked by a binary coded sector mark. These sector marks are identical. Only a fragment of a full sector mark is shown in FIG. 1. The binary code for a full sector is shown at the top of FIG. 1. The "1's" and the "0's" of this sector code are determined by the pattern of magnetic zones in the individual cells. The "0's" are defined by a two-phase magetic zone recording in a cell and the "1's" by a four-phase magnetic zone recording in each cell. Four phases of servo code in a single cell representing a "1" are illustrated, although two phases may be used. When two phases of servo code represent a "1" a single phase of servo code represents a "0".

Because of space limitations the pattern of servo code has been compressed vertically as viewed. Typically, the servo surface comprises an outer guard band, a sector mark section adjacent thereto comprising a plurality of tracks, a section of servo code corresponding to the data sections on the surfaces of the data discs, and, in some instances, an inner guard band section.

The outer guard band comprises a plurality of single phase magnetic zone recordings disposed at the beginning of each cell. These magnetic zone recordings are illustrated as spanning a plurality of tracks in the outer guard band. Each cell is divided into four phases denoted A, B, C and D at the top of FIG. 1. The magnetic zones in the guard band are each recorded in phase A. Thus during operation, a magnetic head always senses the beginning of a cell and in a system employing a cell counter may be locked onto phase A of any selected cell in a sector.

As seen in FIG. 1, four phases of the servo code are recorded in each cell of the servo track section of the dedicated servo disc surface. This servo code comprises inphase and quadrature phase magnetic zones, I and Q, respectively, in adjacent tracks. The inphase magnetic zones I are recorded in phases B and D of a single cell while the quadrature phase magnetic zones Q are recorded in phases A and C of the same cell. This defines a repeating and continuous pattern in consecutive cells in that circular area of the servo disc which corresponds to the circular area of the data on the surfaces of the data discs. The radial centers of the inphase pairs of magnetic zones in adjacent tracks define the radial boundaries of the inphase servo (data) tracks. The quadrature phase magnetic zones are recorded centrally on the inphase servo tracks. Data recording on the data disc surfaces is done on the inphase track center, using the inphase magnetic zones for track centering. Sampled servo, that is, inphase magnetic zones, is recorded on the data disc surfaces using the quadrature phase magnetic zones for track centering.

Figure 5:
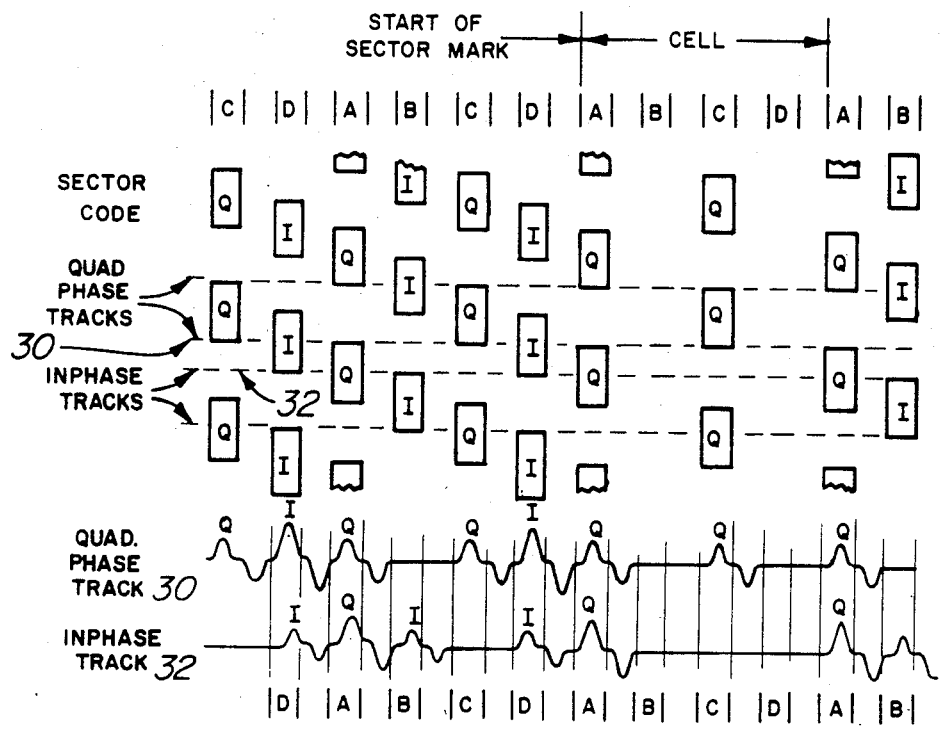
FIG. 5 illustrates typical amplified and filtered magnetic head outputs in traversing different servo tracks in a four-phase servo code.

FIG. 5 illustrates typical amplified and filtered magnetic head outputs when track following in a track centered position on inphase and quadrature phase servo tracks. Alternating time varying voltages are produced as the magnetic head passes over the magnetic zones. The voltage amplitude is greatest when the head is centered over a magnetic zone. When track centered on an inphase voltage track, say track 32, the magnetic head produces equal amplitude inphase voltage wave forms I. Differences in there inphase voltages are used to center the head over an inphase track. The differences in the quadrature phase voltages as derived along track 3D are used for quadrature phase track centering.

Figure 6:
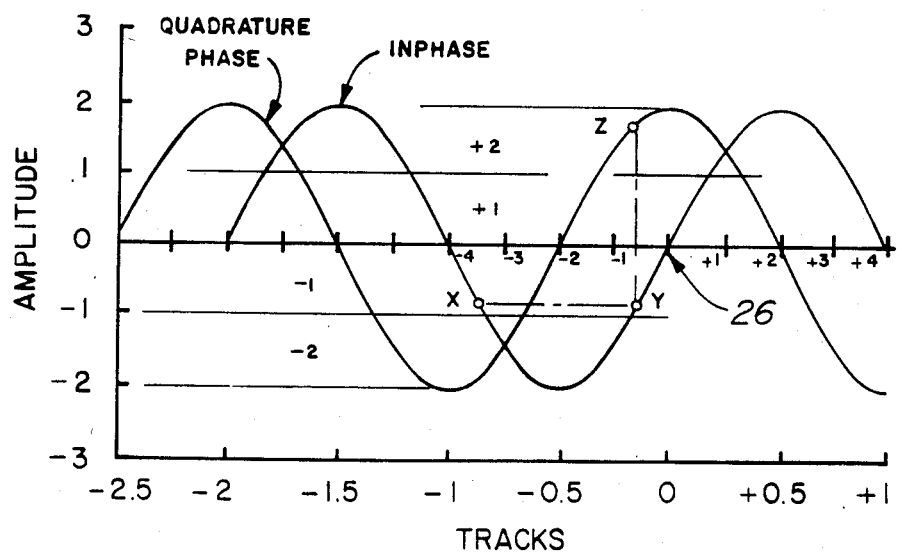
FIG. 6 illustrates characteristic inphase and quadrature phase track offset determining voltages developed from and showing an aspect of the utility of the four-phase servo code.

FIG. 6 illustrates the utility of quadrature and inphase voltages in determining head offset in any quadrant on either side of a track center 26. An inphase voltage at position Y in quadrant −1 is duplicated at position X in quadrant −4. The ambiguity is resolved by refering to the lagging quadrature phase voltage at position Z in quadrant −1.

Referring to FIGS. 2, 3 and 4, the magnetic head 1 comprises a body portion 2 and an electromagnetic pickup 3. The magnetic head is of a molded ferrite material. The magnetic circuit of the electromagnetic pickup 3 may be an integral or separately attached part of the body 2. the bottom pole face 4 of the magnetic circuit (FIG. 3 and 4) is of a width corresponding to the width (the longer dimension) of a magentic zone and its end face defines a small air gap 5 with the adjacent or confronting face of the body 2. The bottom face of the body 2 at its lateral edges is provided with integral sliders 6 having smooth faces which engage the disc surface and ride the disc surface during disc spinup and spindown periods. These surfaces, when engaged with the disc surface, keep the pole face 4 slightly spaced from the disc surface. A coil 7 is wound about one leg of the magnetic circuit 3.

The lateral dimension of the body 2 of the magnetic head is sufficient to span many magnetic zones 8 radially over the surface of a disc 9. This situation is characterized in FIG. 4, which is not to scale. Typically, these servo tracks as well as data tracks on the data discs may be on 0.0016 inch centers or less. The body of a magnetic head may have a lateral dimension of 0.125 inches and a longitudinal dimension of 0.160 inches. The dimension between the sliders of the magentic head will be slightly less than the lateral dimension of the body of the magnetic head.

This situation, again not to scale, has been approximated in FIG. 1, which shows the magnetic head in dot dash outline. The electromagnetic pickup 3 is track centered on a quadrature phase track. The lower half of the body of the magnetic head spans a plurality of the servo tracks while the upper half of the body of the magnetic head reaches into the outer guard band tracks. The servo head is affected by magnetic transitions located on either side of the magnetic flux sensing element 3 of the magnetic head. This sensitive distance is approximately one half of the width between the sliders 6, see FIG. 4. In a high density disc drive this involves a significant number of tracks.

When the magnetic head is in the position shown in FIG. 1, the affect of the guard band on the read signal is to slightly add to the servo code pulse which is inphase with the guard band pulse. This is the situtation shown in FIG. 1 which shows the electromagnetic pickup 3 passing over an inphase magnetic zone I. Track following or track centering operations are taking place in this example, using the quadrature phase magnetic zones Q which are inphase with the single phase guard band code in phase A but which are unrelated to guard band code in phase C. Thus, in phase A the single phase guard band zone will add to the read signal but there will be no affect on the servo code pulse or read signal, which is 180 degrees out of phase with the guard band, in phase C. This introduces an offset or error signal in the position signal decoded from the servo code near the guard band. This persists as long as the slider on one side of the magnetic head body is in the guard band. The situation depicted here is that which exists during periods when sampled servo code is being written on the data discs along the edges of the data tracks. This servo code must be precisely positioned radially if track centering on the data is to be realized. Normally during reading and writing data, track centering is achieved using the inphase magnetic zones I.

Figure 7:
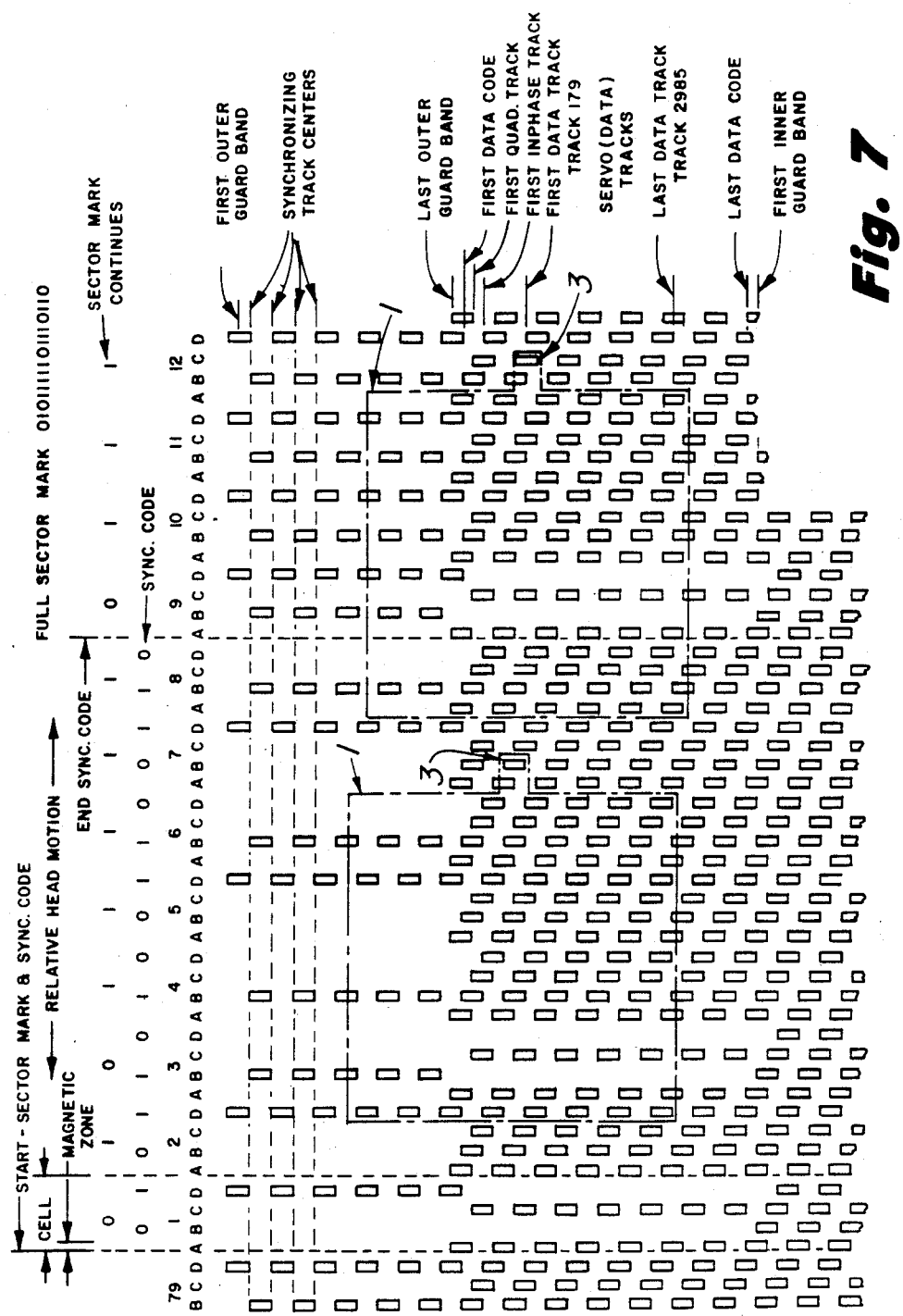
FIG. 7 depicts a portion of the improved servo disc of this invention, having four phases of servo code, a section of two phase sector code in the servo code and a section of single phase synchronizing code in the guard band.

This invention solves the problem of the position signal error in the vicinity of the guard band by changing the guard band magnetic zone format from single phase to two phase. This improved guard band format is illustrated in the top part of FIG. 7. Here the guard band is written with two phases of magnetic zones which are 180 degrees apart in the period defined by a magnetic cell. These two phases of magnetic zones are written in a single cell, one in each adjacent track, in a repeating pattern throughout a sector. They are written in the same phases as the phases used for data track centering. These as used here, are phases B and D, referred to as the inphase magnetic zones.

Since two phases of guard band magnetic zones exist, phase locking on either phase may take place. This ambiguity is corrected by providing a synchronizing code in the guard band at the beginning of each sector. Although not a part of this invention, it should be noted that the servo disc is divided into sectors and that the disc drive microprocessor maintains a sector count. The first sector on the disc is identified by two identical 16 bit sector marks, one at the start of the sector and one in the center of the sector. Each following sector has a single identical sector mark. The synchronizing code also contains 16 bits and is a pattern that distinguishes it from the sector code. This synchronizing code is expressed in binary code in phases B and D at the top of FIG. 7. The binary bit "0" is defined by the absence of magnetic zones in either the phase B or the phase D in a cell in the guard band. The binary bit "1" is defined when magnetic zones are recorded in either phase B or phase D in a cell in the guard band. In the synchronizing code pattern illustrated, 8 phases in the guard band are omitted out of 158 phases in the full sector. This results in some imbalance, but the affect is not continuous and is brief. It is small enough to be neglected. The synchronization and sector patterns which have been chosen require that at least two errors in reading the written magnetic transitions must occur before a synchronizing code may be interperted as a sector mark and vice versa.

The magnetic head on the servo disc is shown, not to scale, in two different track following positions in FIG.

7. In the position shown on the left, the magnetic head is track following on the quadrature phase track center. This track following mode would be used for instance, in writing short bursts of servo code, to be used for track centering purposes, on the edges of the data tracks on the data discs. Track centering is now accomplished using magnetic zones Q in phase A and C. Since the magnetic zones for the guard band are recorded in phases B and D there is no correspondence with the two phases of quadrature phase servo code being used to generate the position error signal for track centering purposes. Hence, there is no contribution to the signal from the servo head due to the proximity of the guard band and no position error signal is generated.

The magnetic head on the right is shown in a position track centered on an inphase track. The inphase magnetic recordings are now sensed for track centering. These two phases (phase B and phase D) of inphase servo code are in phase with the two phases of guard band code. Thus the affect of a nearby guard band is the same on both phases of servo code. Since the position error signal is the difference in amplitude between the two phases, the offset due to the proximity of the guard band is balanced between the two phases and there is no net effect.

Figure 8:
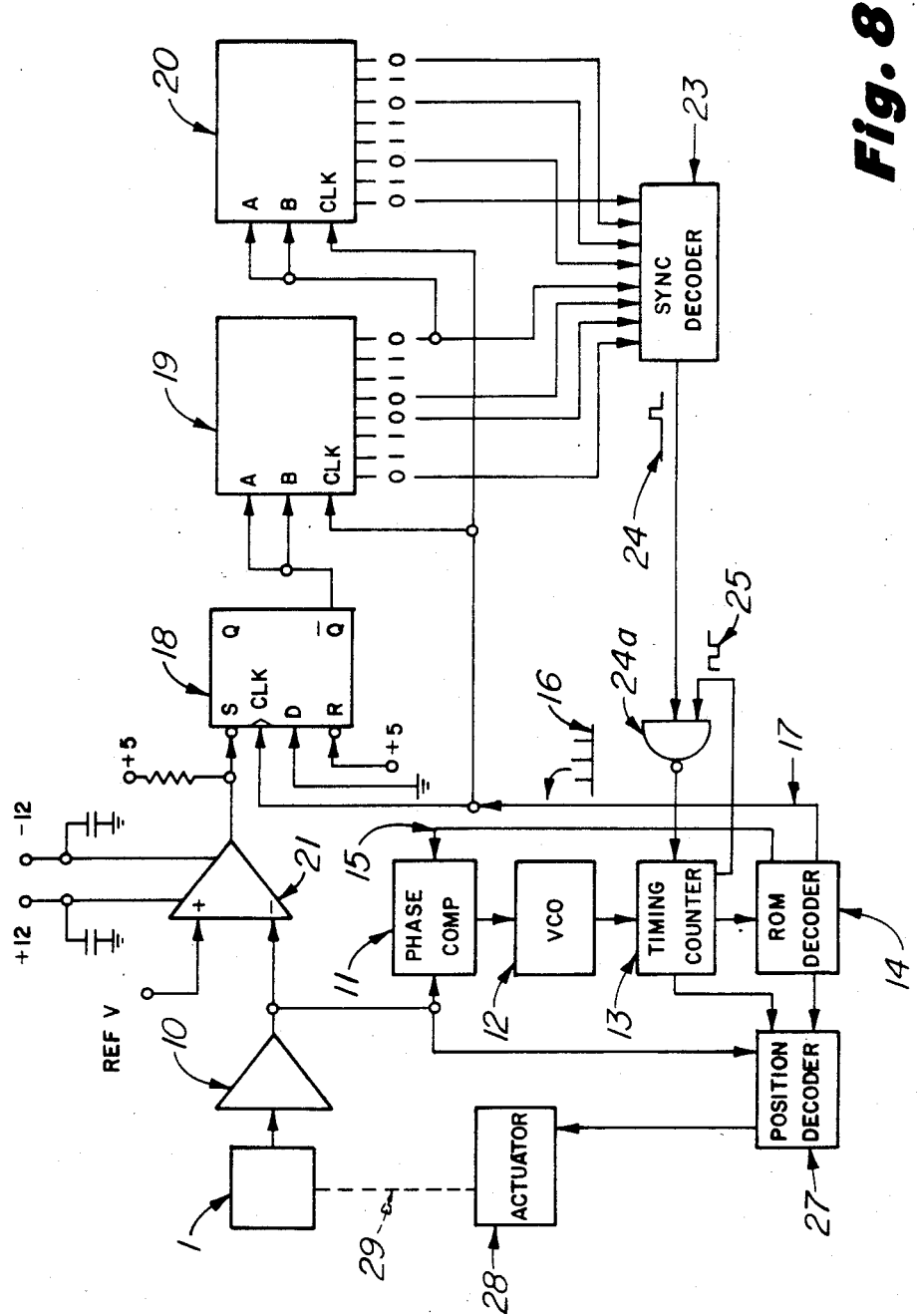
FIG. 8 is a block diagram of a servo system responsive to the servo code and the synchronizing servo code for positioning the magnetic head.

A magnetic head positioning system including a synchronizing code decoder is shown in FIG. 8. The purpose of this circuit is to provide a synchronizing signal at the end of the synchronizing code to lock a phase locked loop to a specific phase in a sector to properly position the magnetic head. That specific phase is phase B in the cell 9 immediately following the end of the synchronizing code, as numbered at the top of FIG. 7. It is evident that either phase B or D in cell 9 or another cell may be selected for this purpose as a matter of choice. This cell count and the selected phase indicate a precise position of the magnetic head with respect to the start of a sector, which together with a sector count indicate a precise position in a selected sector.

Figure 9:
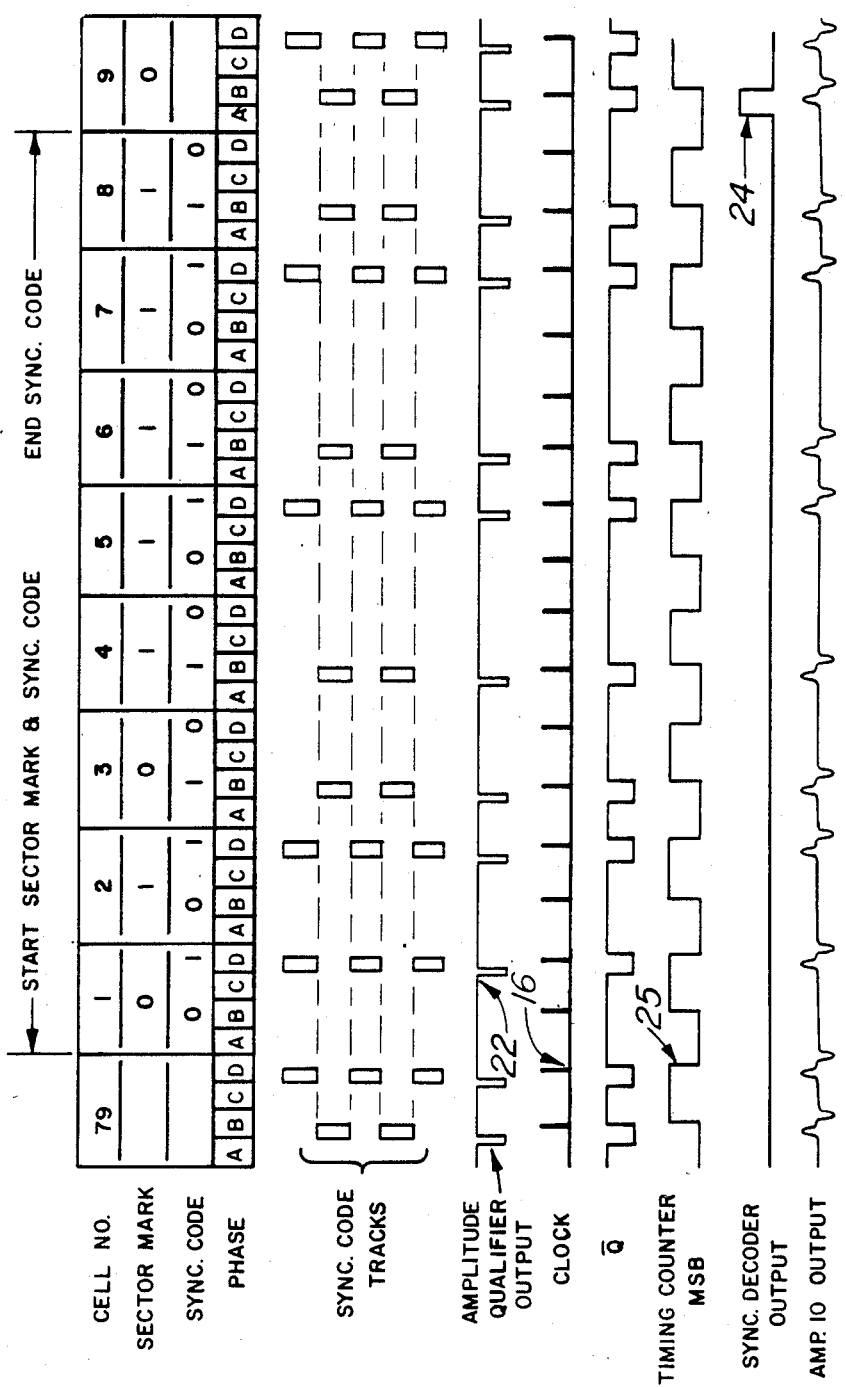
FIG. 9 is a timing signal diagram relating the timing signals to the phases of the synchronizing code.

Referring now to both FIGS. 8 and 9, the output of the magnetic head 1 is coupled to the input of a read amplifier 10. The amplified and filtered output of the read amplifier is depicted at the bottom of FIG. 9 for the situations in which the magnetic head traverses any of the synchronizing code tracks in the outer guard band. In FIG. 8, the output of the read amplifier 10 is coupled to the input of a phase comparator 11 controlling a free running voltage controlled oscillator 12. The voltage controlled oscillator 12 drives a timing counter 13. A read only memory decoder 14 responsive to the timing counter has a first output circuit 15 coupled back to the phase comparator 11 for synchronizing the loop in a predetermined phase relationship with respect to the output voltage of the read amplifier 10. Clock pulses 16, FIG. 9, from a second output circuit 17 of the decoder 14, are coupled to a flip flop 18 and cascaded shift registers 19 and 20, timing the signal states of the flip flop and signal shifts in the shift registers.

The output of the read amplifier 10 is also coupled to one input terminal of an amplitude qualifier circuit 21. The other input terminal of the amplitude qualifier 21 is coupled to a fixed reference voltage which establishes a threshold for amplitude qualification. The output of the amplitude qualifer 21 is a square wave signal 22 (see FIG. 9). The output of the amplitude qualification circuit is normally in the higher of its two voltage states, switching to its lower voltage state with each positive going excursion of the output of the read amplifier 10.

The set input terminal of flip flop 18, which is a set-reset type of flip flop, is coupled to the output of the amplitude qualifier 21. The reset terminal of this flip flop is connected to a fixed reference voltage to disable the reset function. The clock input terminal receives the clock pulses 16 (FIG. 9). The Q output terminal of this flip flop is coupled to the input of the first of the two cascaded shift registers 19 and 20 which are also synchronized by the clock pulses 16. The output of the last stage of the shift register 19 is in turn coupled to the input of the shift register 20. The Q output of the flip flop 18 has two voltage states. The normal or higher of the two voltage states represents the binary bit "0" and the lower voltage state represents the binary bit "1". The timing relationship of the output voltage 22 of the amplitude qualifier 21, the clock pulses 16 and the voltage states, Q, of the flip flop 18 is seen in FIG. 9. The Q output of the flip flop is in the higher of its two voltages states at any time that the amplitude qualifier output voltage 22 is in the higher of its two voltage states and is switched to the lower of its two voltage states by the negative going excursion of the output voltage 22 of the amplitude qualifier 21. Also, whenever the voltage 22 at the terminal S of the flip flop is in the higher of its two voltage states, the occurance of a clock pulse 16 results in switching of the flip flop 18 so that the Q output is switched to the higher of its two voltage states. These voltage states of the Q output terminal of the flip flop 15 are clocked into the cascaded shift registers 19 and 20. This loads the shift registers with the synchronizing code which is read at the output terminals of the shift registers, proceeding from right to left as viewed.

Only those voltage states representing logical zeros in the synchronizing code are coupled from the shift registers 19 and 20 to the input of a synchronizing decoder 23, including a programmable read only memory, where the synchronizing code is decoded. The output of the synchronizing decoder 23 is coupled to the timing counter 13. The synchronizing decoder output is a square wave pulse 24, illustrated in FIG. 9. This square wave pulse spans phase B of cell 9.

The timing counter 13 and the decoder 14 generate the timing signals required by the position decoder 26. These timing signals are produced by a read only memory in the decoder 14, which is addressed by the timing counter 13. The timing counter responds to the output of the voltage controlled oscillator 12 producing clock pulses at twice the frequency of the clock pulses 16. The changing state of the most significant bit 25 of the timing counter 13 is plotted in FIG. 9 above the synchronizing detector output 24. The timing counter 13 should always contain a predetermined count when the synchronizing decoder output pulse 24 occurs. This count is represented as the lower of the two voltage states of the most significant bit 25 in the count cycle. Each count cycle corresponds to one magnetic cell, as shown, and may be referred to as a cell count signal. The synchronizing decoder output is used to control the count load of the counter and thereby to force all of the timing signals into a proper time relationship with the synchronizing decoder output 24. To this end a gate 24a, enabled by the most significan bit signal 25 in the lower of its two voltage states, is used to couple the synchronizing decoder pulse 24 to the timing counter 13. If the timing relationships are already correct, the counter is loaded with the count that is already present and no change occurs. If the timing relationships are not correct, the counter changes state and the timing is corrected at the occurance of the next synchronizing decoder output pulse 24.

A position decoder 27 responding to the output of the timing counter 13 and the decoder 14, locks onto phase B of cell 9, FIG. 9, completing the phase locking operation, and produces position error signals for track centering or track following purposes.

The output of the position decoder 27 controls an actuator 28 driving the carriage 29 which controls the magnetic head 1.

Although this invention has been described in connection with servo code patterns involving four phases of servo code, it will be appreciated that the invention may be practiced using only two phases of servo code and these phases may involve phases A and C or phases B and D according to the teachings herein.

INDUSTRIAL APPLICABILITY

This invention is generally useful in any memory system involving relative movement between the magnetic media and the magnetic head and involving pluralities of data tracks which are to be accessed under selected conditions. The invention is particularly useful in disc memory types of systems.

What is claimed is:

1. A servo disc for a disc memory drive, comprising:
  a. a memory having a uniformly magnetized disc surface of one magnetic polarity;
  b. a servo section of said disc surface having at least two phases of discrete magnetic zones in a repeating pattern in concentric servo tracks in said disc surface;
  c. a guard band section of said disc surface comprising two phases of discrete magnetic zones in a repeating pattern in said disc surface, in concentric guard tracks concentrically disposed with respect to said concentric servo tracks, respectively in a predetermined phase relationship with respective phases of said discrete magnetic zones of said servo code;
  d. each said two phases of discrete magnetic zones in said servo section and said two phases of discrete magnetic zones in said guard band section being of a magnetic polarity different from said one magnetic polarity and defining and lying within a magnetic cell extending radially of said memory disc.

2. The invention according to claim 1, in which:
  a. the respective phases of said discrete magnetic zones of said guard band are in phase with the respective phases of said discrete magnetic zones of said servo section in the same magnetic cell.

3. The invention according to claim 1, in which:
  a. the respective phases of said discrete magnetic zones of said guard band are similarly out of phase with the respective phases of said discrete magnetic zones of said servo section in each magnetic cell.

4. The invention according to claim 1, in which:
  a. said servo section includes four phases of discrete magnetic zones in a single magnetic cell, in quadrature phase relationship, in a repeating pattern in adjacent concentric servo tracks, and
  b. said two phases of discrete magnetic zones in said guard band section being in phase with two phases of said four phases of discrete magnetic zones in said servo section in the same magnetic cell.

5. The invention according to claim 4, in which:
  a. said two phases of discrete magnetic zones of said guard band section in a single magnetic cell are in 180 degree relationship with each other and are respectively in phase with respective correspondingly phased discrete magnetic zones of said servo section in the same magnetic cell.

6. The invention according to claim 4, in which:
  a. said two phases of discrete magnetic zones of said guard band section in a single magnetic cell are in 180 degree phase relationship with each other and are in quadrature phase relationship with one of two phases of discrete magnetic zones of said servo section which are in 180 degree relationship with each other in said magnetic cell.

7. The invention according to claim 1, in which:
  a. said guard band section additionally comprises a predetermined pattern of single phases of discrete magnetic zones in different phase positions in different magnetic cells, defining a synchronizing code.

8. The invention according to claim 1, in which:
  a. said servo section additionally comprises a predetermined pattern of single phases of discrete magnetic zones in different phase positions in different magnetic cells, defining a sector mark.

9. The invention according to claim 1, in which:
  a. said servo section additionally comprises a predetermined pattern of four phases of discrete magnetic zones and two phases of discrete magnetic zones in different adjacent magnetic cells, defining a sector mark.

10. The invention according to claim 1, in which:
  a. said servo section comprises additionally a predetermined pattern of at least two phases of discrete magnetic zones and single phase discrete magnetic zones in different adjacent magnetic cells, defining a sector mark; and
  b. said guard band section comprises additionally a predetermined pattern of single phases of discrete magnetic zones in differing phase positions in different adjacent magnetic cells, defining a synchronizing code.

11. The invention according to claim 10, in which:
  a. said servo section comprises a predetermined pattern of four phases of discrete magnetic zones and two phases of discrete magnetic zones in different adjacent magnetic cells, defining a sector mark.

12. The invention according to claim 10, in which:
  a. the beginning of said synchronizing code is substantially coincident with the beginning of said sector mark.

13. A disc memory drive, comprising:
  a. a memory disc having a magnetized disc surface of one magnetic polarity and radially extending circumferentially adjacent magnetic cells;
  b. a guard band section having a predetermined pattern of single phases of discrete magnetic zones in differing phase positions in said magnetic cells in concentric guard tracks, defining a synchronizing code;
  c. a servo section having at least two phases of discrete magnetic zones in each of said magnetic cells in a repeating pattern in concentric servo tracks which are concentrically disposed with respect to said concentric guard tracks, respectively in a predetermined phase relationship with individual phases of said discrete magnetic zones of said synchronizing code;
  d. means for rotating said memory disc;

e. a magnetic head for sensing said discrete magnetic zones;
f. servo means responsive to the output of said magnetic head for moving said magnetic head radially over said surface of said memory disc and for maintaining said magnetic head centered over a selected guard band track;
g. means for producing a cell count signal;
h. means for producing an end of synchronizing code signal, and
i. means responsive to said cell count signal and to said end of synchronizing code signal for phase locking said servo means to a predetermined phase in a predetermined magnetic cell on said memory disc.

14. The invention according to claim 13, in which:
a. said discrete magnetic zones of said servo section have a predetermined pattern of two phases of discrete magnetic zones and single phase discrete magnetic zones in adjacent magnetic cells defining a sector mark differing from said synchronizing code.

15. The method of eliminating apparent offset in the servo code in a magnetic disc drive, comprising:
a. writing a guard band in adjacent concentric guard band tracks on a servo disc, using two phases of pulses;
b. writing a servo section in adjacent concentric servo tracks on said servo disc using two phases of pulses which are in phase with said two pulses used in writing said guard band, and
c. using said two phases of servo code to generate a position error signal.

16. The method of eliminating apparent offset in the servo code in a magnetic disc drive, comprising:
a. writing a guard band in adjacent concentric guard band tracks on a servo disc using two phases of pulses;
b. writing a servo section in adjacent concentric servo tracks on said servo disc using two phases of pulses respectively in quadrature phase with said two pulses used in writing said guard band; and
c. using said two phases of servo code to generate a position error signal.

17. The method of phase locking on a selected phase of a multiphase guard band on a servo disc surface, comprising:
a. providing a synchronizing code in said guard band having a pattern of single phase magnetic zones in different phase positions in separate adjacent magnetic cells on said servo disc surface;
b. decoding said synchronizing code to produce an end of synchronizing code signal;
c. producing cell count signals; and
d. utilizing said end of synchronizing code signal and a predetermined one of said cell count signals to provide a phase lock signal.

* * * * *